US012763397B2

(12) United States Patent
Yang et al.

(10) Patent No.: US 12,763,397 B2
(45) Date of Patent: Oct. 13, 2026

(54) BATTERY PACK AND MANUFACTURING METHOD THEREFOR

(71) Applicant: LG ENERGY SOLUTION, LTD., Seoul (KR)

(72) Inventors: Jin Oh Yang, Daejeon (KR); Hae Won Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 663 days.

(21) Appl. No.: 18/026,266

(22) PCT Filed: Oct. 21, 2021

(86) PCT No.: PCT/KR2021/014847
§ 371 (c)(1),
(2) Date: Mar. 14, 2023

(87) PCT Pub. No.: WO2022/086234
PCT Pub. Date: Apr. 28, 2022

(65) Prior Publication Data

US 2023/0369674 A1 Nov. 16, 2023

(30) Foreign Application Priority Data

Oct. 22, 2020 (KR) ........................ 10-2020-0137510

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/643* (2015.04);
(Continued)

(58) Field of Classification Search
CPC ............. H01M 10/653; H01M 10/613; H01M 10/643; H01M 10/6556; H01M 10/6567; H01M 50/213; H01M 50/264; Y02E 60/10
See application file for complete search history.

(56) References Cited

U.S. PATENT DOCUMENTS

2005/0022966 A1 2/2005 Takahashi
2014/0295242 A1* 10/2014 Kimura .............. H01M 50/264 429/120

(Continued)

FOREIGN PATENT DOCUMENTS

CN 108987664 A 12/2018
CN 111092179 A 5/2020

(Continued)

OTHER PUBLICATIONS

Notice of Allowance issued Jan. 15, 2024 for Japanese Patent Application No. 2022-567183 (Note: US 2018/0223070 A1 was cited in a prior IDS.).

(Continued)

*Primary Examiner* — Eugenia Wang
(74) *Attorney, Agent, or Firm* — Morgan, Lewis & Bockius LLP

(57) ABSTRACT

A battery pack includes a frame having an inner space and an opened side; a plurality of battery cells each having one end disposed in the inner space of the frame and the other end protruding to the outside of one side of the frame; a filling material filled in the inner space of the frame; a heat sink disposed to face one side of the frame and configured to cool the battery cells; and a plurality of cell holders having a plurality of insertion holes to which the other ends of the battery cells are respectively inserted and stacked to each other between the frame and the heat sink. A volume of the inner space of the frame and an amount of the filling (Continued)

material filled in the inner space of the frame are adjusted according to the stacked number of the cell holders.

14 Claims, 6 Drawing Sheets

(51) Int. Cl.

| | |
|---|---|
| ***H01M 10/643*** | (2014.01) |
| ***H01M 10/6556*** | (2014.01) |
| ***H01M 10/6567*** | (2014.01) |
| ***H01M 50/213*** | (2021.01) |
| ***H01M 50/264*** | (2021.01) |

(52) U.S. Cl.

CPC ... *H01M 10/6556* (2015.04); *H01M 10/6567* (2015.04); *H01M 50/213* (2021.01); *H01M 50/264* (2021.01)

(56) References Cited

U.S. PATENT DOCUMENTS

| | | | | |
|---|---|---|---|---|
| 2018/0223070 | A1 | 8/2018 | O'Neil et al. | |
| 2019/0081294 | A1* | 3/2019 | Capati | B60L 50/64 |
| 2019/0260005 | A1 | 8/2019 | Smith et al. | |
| 2020/0083575 | A1* | 3/2020 | Yoo | H01M 10/6554 |
| 2020/0127249 | A1 | 4/2020 | Yoon et al. | |
| 2020/0194853 | A1 | 6/2020 | Yoo et al. | |
| 2021/0203028 | A1* | 7/2021 | Ahn | H01M 50/289 |
| 2021/0399358 | A1 | 12/2021 | Knaupp et al. | |

FOREIGN PATENT DOCUMENTS

| | | | | |
|---|---|---|---|---|
| EP | 3654444 | A1 | 5/2020 | |
| JP | 2005-56837 | A | 3/2005 | |
| JP | 2020-507194 | A | 3/2020 | |
| JP | 2020-520072 | A | 7/2020 | |
| JP | 2020-522850 | A | 7/2020 | |
| KR | 10-2005-0011724 | A | 1/2005 | |
| KR | 10-2019-0047499 | A | 5/2019 | |
| KR | 10-2019-0047513 | A | 5/2019 | |
| KR | 10-2019-0053106 | A | 5/2019 | |
| KR | 10-2019-0078094 | A | 7/2019 | |
| KR | 10-2019-0132631 | A | 11/2019 | |
| WO | WO-2019083176 | A1 * | 5/2019 | H01M 10/6556 |
| WO | 2019/164974 | A1 | 8/2019 | |
| WO | 2020108988 | A1 | 6/2020 | |

OTHER PUBLICATIONS

Extended European Search Report issued Mar. 1, 2024 for European Patent Application No. 21883302.8.

International Search Report (with partial translation) and Written Opinion dated Feb. 7, 2022, issued in corresponding International Patent Application No. PCT/KR2021/014847.

* cited by examiner

BATTERY PACK AND MANUFACTURING METHOD THEREFOR

BACKGROUND

The present disclosure relates to a battery pack and a manufacturing method thereof, and more particularly, to a battery pack capable of stably fixing and supporting battery cells and a manufacturing method thereof.

In general, a battery cell may be repeatedly charged and discharged by an electrochemical reaction of components thereof. A battery pack may include a plurality of battery cells to increase an output voltage or an output current.

Here, since the battery cells of the battery pack are densely arranged, it is important to dissipate heat generated from each of the battery cells. When the heat generated from the battery cells are not properly dissipated in a charge and discharge process, heat accumulation may be generated in the battery pack to overheat the battery cells. Thus, the battery cells may be ignited and exploded.

Typically, when the battery pack is manufactured, a filling material is injected to a space between the battery cells. Since the filling material may fix the battery cells and easily dissipate the heat generated from the battery cells, the filling material may retard or prevent the ignition or explosion of the battery cells. However, the filling material is difficult to be uniformly filled in the entire space between the battery cells, and the filling of the filling material into the space between the battery cells requires much time and costs.

RELATED ART DOCUMENT

Patent Document (Patent document 1) KR2019-0132631 A

SUMMARY

The present disclosure provides a battery pack capable of stably fixing and supporting battery cells and a manufacturing method thereof.

The present disclosure also provides a battery pack capable of decreasing a usage amount of a filling material filled in a space between battery cells and a manufacturing method thereof.

In accordance with an exemplary embodiment, a battery pack includes: a frame having an inner space and an opened one side; a plurality of battery cells each having one end disposed in the inner space of the frame and the other end protruding to the outside of one side of the frame; a filling material filled in the inner space of the frame; a heat sink disposed to face one side of the frame, thereby cooling the battery cells; and a plurality of cell holders having a plurality of insertion holes to which the other ends of the battery cells are respectively inserted and stacked to each other between the frame and the heat sink. Here, a volume of the inner space of the frame and an amount of the filling material filled in the inner space of the frame are adjusted according to the stacked number of the cell holders.

The cell holders may support a circumference of the other end of each of the battery cells, and the filling material may not be filled in a space in which the cell holders are disposed and support the one end except for the other end of each of the battery cells.

The cell holder may have a plate shape to cover a cross-section of the inner space of the frame, and a circumference of the cell holder may contact one side end of the frame.

The cell holder may include a plurality of fixing plates that are detachably connected on a plane in correspondence to an arrangement structure of the battery cells, and the insertion holes may be defined in the fixing plate.

At least a portion of the fixing plates may have the different number of the insertion holes.

A total thickness of the stacked cell holders may be 20% or more to 60% or less of a length of the battery cell.

A projection may be provided on one of the frame and the cell holders, which is closest to the frame, and a coupling groove to which the projection is inserted may be provided on the other thereof.

A material of the cell holder may include plastic, and a material of the filling material may include silicon.

In accordance with another exemplary embodiment, a method for manufacturing a battery pack includes: storing one ends of the battery cells in an inner space of a frame; stacking a plurality of cell holders at one side of the frame and respectively inserting the other ends of the battery cells, which protrude to the outside of the frame, to insertion holes formed in the cell holders; and injecting a filling material to the inner space of the frame in order to support a circumference of each of the one ends except for the other ends of the battery cells. Here, the stacking of the plurality of cell holders includes setting the stacked number of the cell holders so as to adjust a volume of the inner space of the frame and an amount of the filling material filled in the inner space of the frame.

The setting of the stacked number of the cell holders may include adjusting a total thickness of the stacked cell holders in a range from 20% to 60% of a length of the battery cell.

BRIEF DESCRIPTION OF THE DRAWINGS

Exemplary embodiments can be understood in more detail from the following description taken in conjunction with the accompanying drawings, in which.

Figure 4:
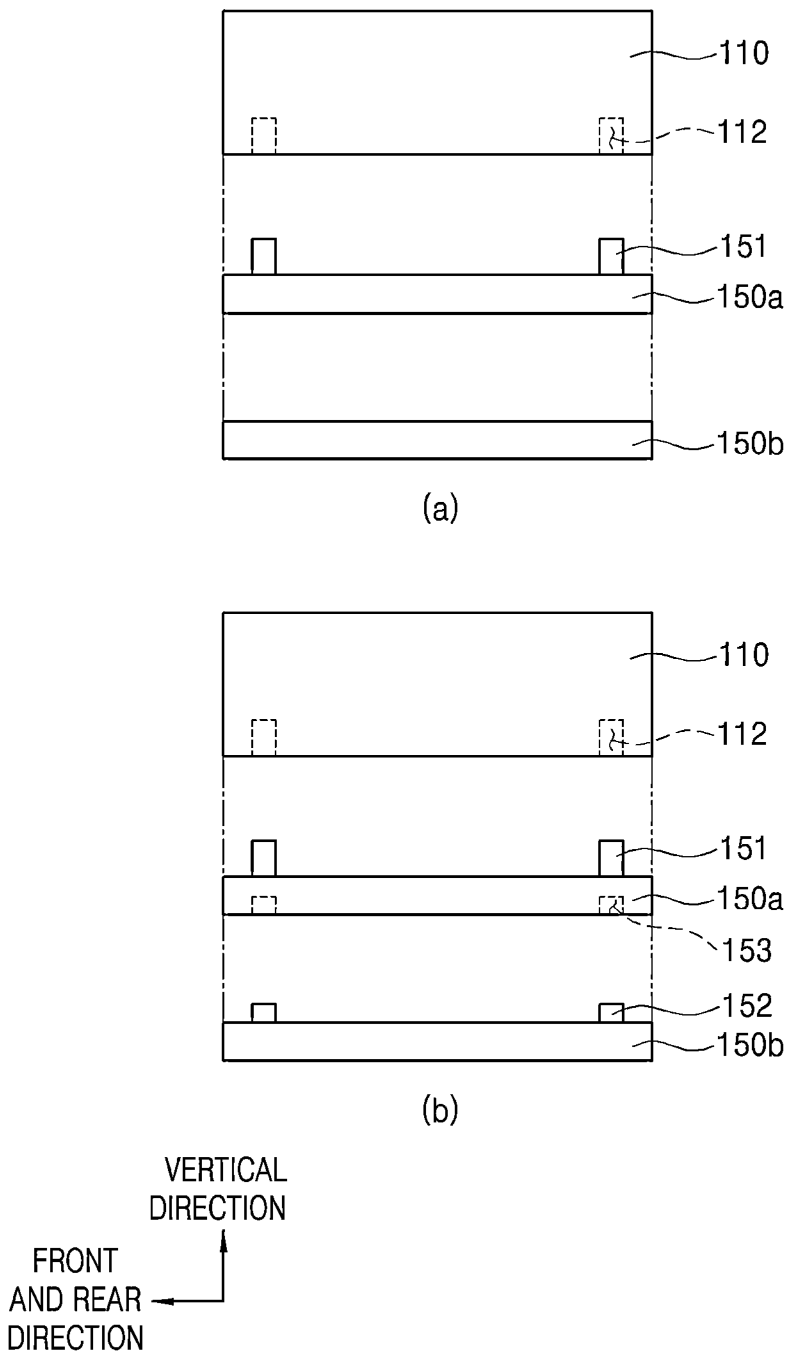
Figure 5:
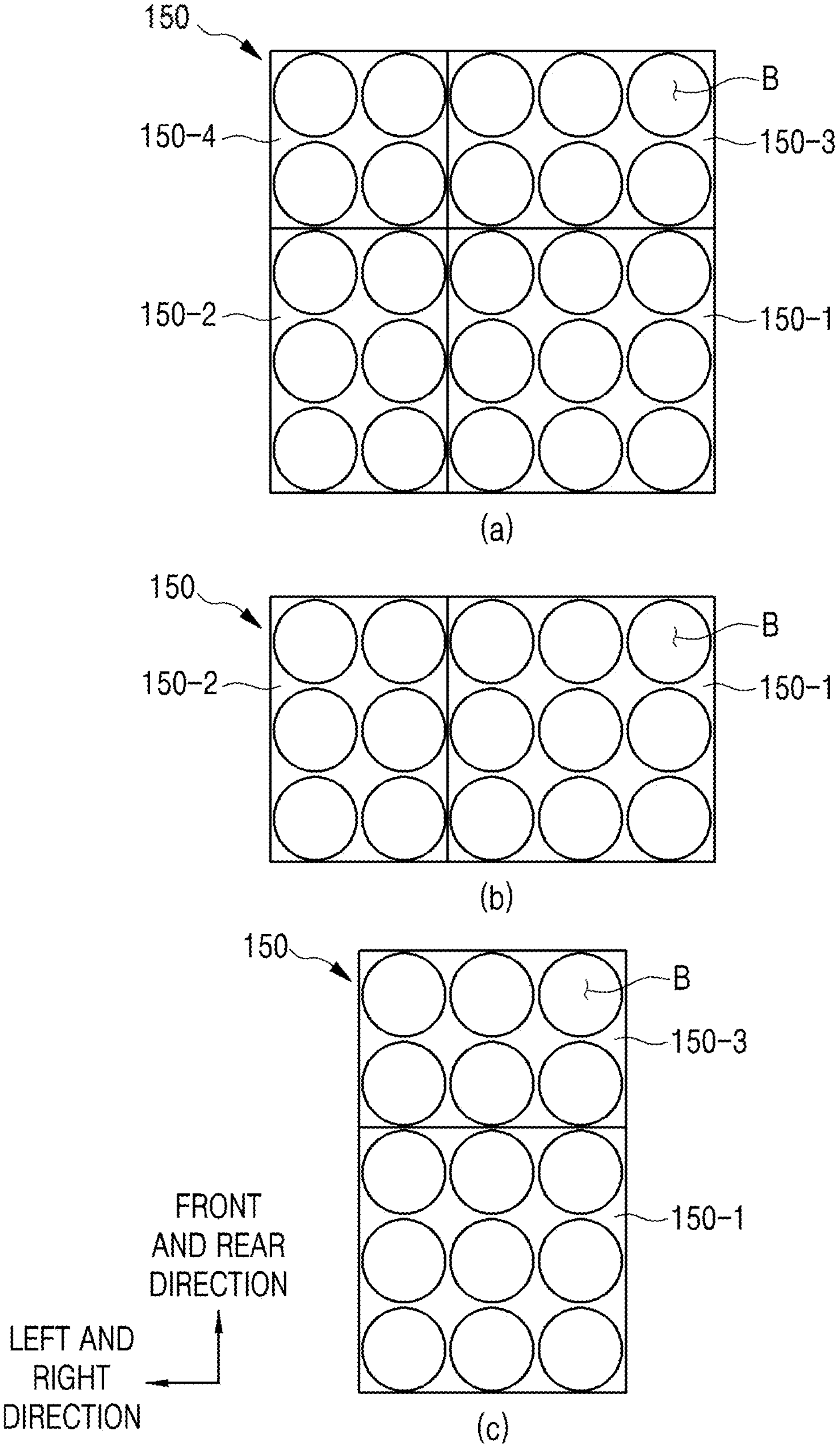
Figure 6:
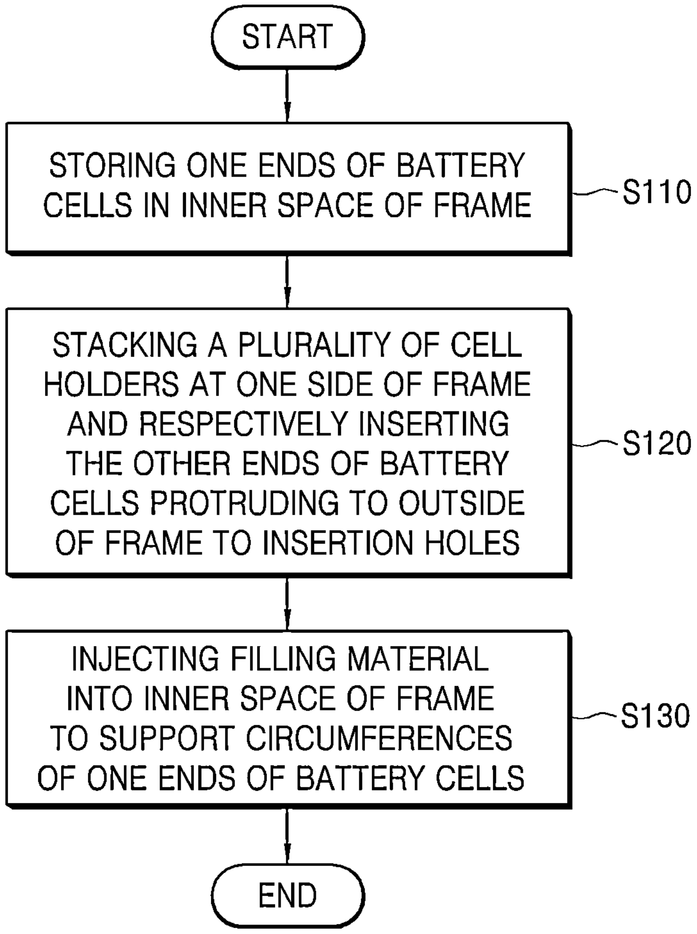

(a) of FIG. 4 is a side view illustrating a coupling structure of a frame and cell holders in accordance with an exemplary embodiment;

(b) of FIG. 4 is a side view illustrating a coupling structure of a frame and cell holders in accordance with another exemplary embodiment;

(a) of FIG. 5 is a plan view illustrating a structure of the cell holder in accordance with an exemplary embodiment;

(b) of FIG. 5 is a plan view illustrating a structure of a cell holder in accordance with another exemplary embodiment;

(c) of FIG. 5 is a plan view illustrating a structure of a cell holder in accordance with yet another exemplary embodiment; and FIG. 6 is a flowchart representing a method for manufacturing a battery pack in accordance with an exemplary embodiment.

DETAILED DESCRIPTION OF EMBODIMENTS

Hereinafter, specific embodiments will be described in detail with reference to the accompanying drawings. The present disclosure may, however, be embodied in many different forms and should not be construed as being limited to the embodiments set forth herein; rather, these embodiments are provided so that this disclosure will be thorough and complete, and will fully convey the concept of the invention to those skilled in the art. In the figures, the dimensions of layers and regions are exaggerated for clarity of illustration, and like reference numerals refer to like elements throughout.

Figure 1:
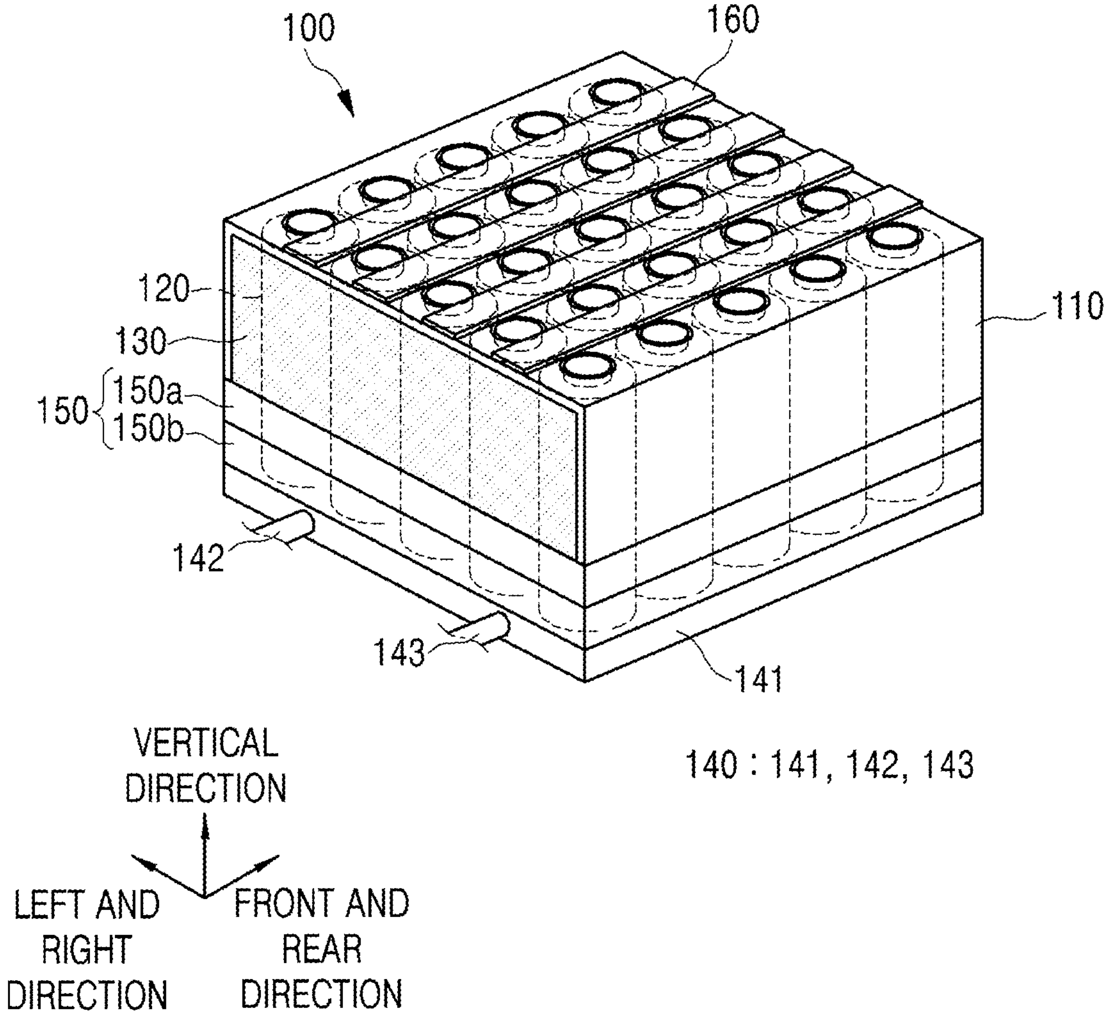
FIG. 1 is a perspective view illustrating a battery pack in accordance with an exemplary embodiment.
Figure 2:
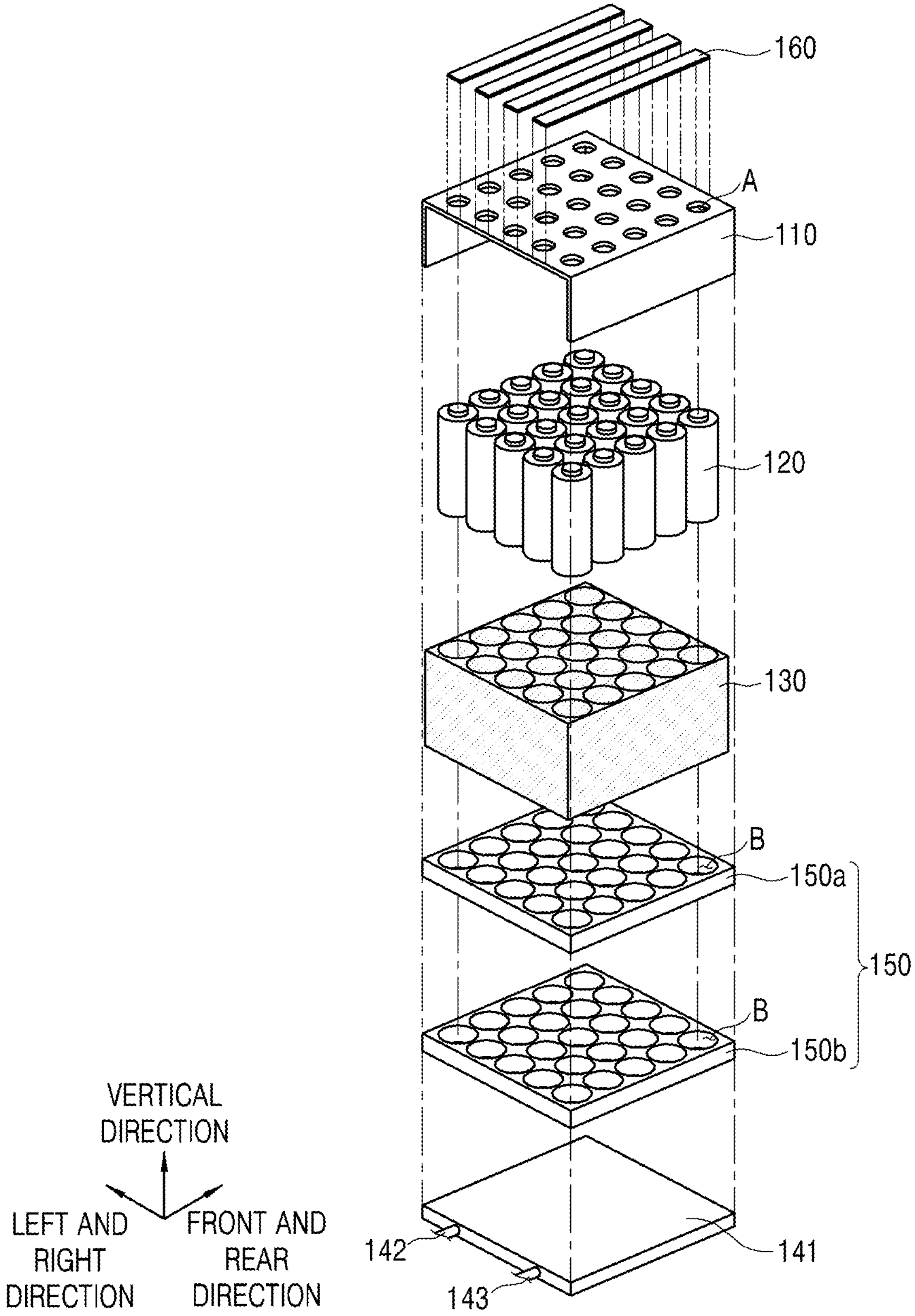
FIG. 2 is an exploded perspective view illustrating a structure of the battery pack in accordance with an exemplary embodiment.
Figure 3:
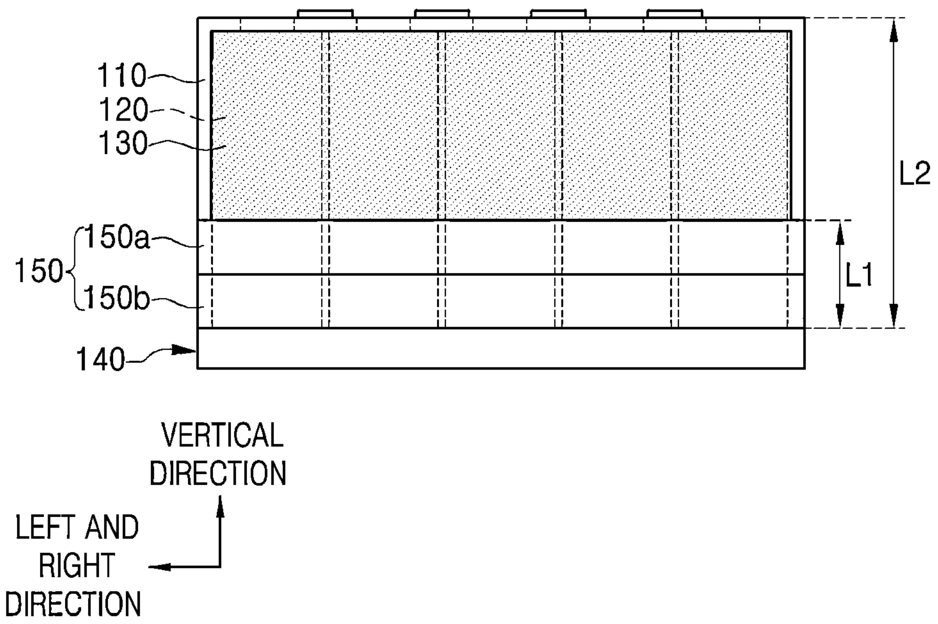
FIG. 3 is a front view illustrating the battery pack in accordance with an exemplary embodiment.

FIG. 1 is a perspective view illustrating a battery pack in accordance with an exemplary embodiment, FIG. 2 is an exploded perspective view illustrating a structure of the battery pack in accordance with an exemplary embodiment, FIG. 3 is a front view illustrating the battery pack in accordance with an exemplary embodiment, FIG. 4 is a side view illustrating a coupling structure of a frame and cell holders in accordance with an exemplary embodiment, and FIG. 5 is a plan view illustrating a structure of the cell holder in accordance with an exemplary embodiment. Hereinafter, a structure of the battery pack in accordance with an exemplary embodiment will be described.

The battery pack in accordance with an exemplary embodiment is a device for supplying power to electronic equipment or system. Referring to FIGS. 1 and 2, a battery pack 100 includes a frame 110, a plurality of battery cells 120, a filling material 130, a heat sink 140, and a cell holder 150.

The battery cell 120 may have a cylindrical shape. For example, the battery cell 120 may be a secondary battery cell and include a positive electrode collector, a negative electrode collector, a separator, an active material, and an electrolyte. The battery cell 120 may be repeatedly charged and discharged by an electrochemical reaction of the above-described components thereof.

Here, the battery cell 120 may be provided in plurality. The battery cells 120 may be spaced apart from each other at predetermined positions. The battery cells 120 may be electrically connected in series or parallel. Thus, the battery pack 100 may increase an output voltage or an output current.

Also, each of the battery cells 120 may have one end (or upper end) disposed in an inner space of the frame 110 and the other end (or lower end) protruding to the outside of one side (or lower side) of the frame 110. That is, the battery cells 120 may have a length extending in one direction (or vertical direction) greater than that of the frame 110.

The frame 110 may have a chamber shape. For example, the frame 110 may have a cuboid box shape. Thus, the frame 110 may have an inner space for accommodating the battery cells 120.

Here, the frame 110 may have an opened one side (or lower side). For example, as the entire low side of the frame 110 is opened, an opening may be formed. Thus, the battery cells 120 may be entered to the inside of the frame 110 through the opening. Since each of the battery cells 120 has the length in the vertical direction greater than that of the frame 110, the lower end of each of the battery cells 120 may protrude from the lower side of the frame 110.

Also, a plurality of through-holes A may be defined in the other side (or top surface) of the frame 110. For example, the through-holes A may each have a circular shape and be arranged in the form of a×b. A terminal disposed at the upper end of the battery cell 120 may be inserted to the through-hole A. Thus, as the terminals of the battery cells 120 are inserted to the different through-holes A, respectively, the battery cells 120 may be arranged in the form of a×b based on an array of the through-holes A.

Here, the terminals of the battery cells 120 may be respectively inserted to the through-holes A and exposed to the outside of the frame 110. A busbar 160 may be installed on the frame 110 and connected with the terminals. For example, the busbar 160 may extend in one direction (or front and rear direction) and be provided in plurality, so that a plurality of busbars 160 are spaced apart from each other in the other direction (or left and right direction). Thus, the battery cells 120 spaced apart from each other in one direction may be electrically connected to each other by the busbars 160. However, the exemplary embodiment is not limited to the number of the busbars 160 and the structure of electrically connecting the battery cells 120. For example, the number of the busbars 160 and the structure of electrically connecting the battery cells 120 may be variously provided.

Also, the frame 110 may have an opened one surface (or front surface). Thus, the filling material 130 may be injected to the inner space of the frame 110 through the opened front surface. However, the exemplary embodiment is not limited to the structure and shape of the frame 110. For example, the frame 110 may have various structures and shapes.

The filling material 130 is filled in the inner space of the frame 110. That is, the filling material 130 may be filled in an empty space that is not occupied by the battery cells 120 in the inner space of the frame 110. Thus, the filling material 130 may be supplied between the battery cells 120 to hold the battery cells 120.

Also, a material of the filling material 130 may include silicon. Thus, the filling material 130 may simultaneously have a thermal conductivity and an adhesive property. Thus, the filling material 130 may be easily formed along a shape of the space between the battery cells 120 to fix the battery cells 120 and transfer the heat generated from the battery cells 120 to the outside.

Here, a feature of providing the filling material 130 to the entire space between the battery cells 120 may require much time and costs. Thus, a volume of the inner space of the frame 110 may be decreased by including the cell holders 150 to decrease a size of the frame 110. Thus, a usage amount of the filling material 130 may be decreased.

The heat sink 140 may face one side (or lower side) of the frame 110. For example, the heat sink 140 may be spaced apart from the lower side of the frame 110 and directly or indirectly contact the battery cells 120 to cool the battery cells 120. The heat sink 140 may include a cooling member 141, a cooling medium supply member 142, and a cooling medium discharge member 143.

The cooling member 141 may have a plate shape. For example, the cooling member 141 may have a rectangular shape along a flat surface shape of the frame 110, and an area of a top surface of the cooling member 141 may be equal to or greater than that of a flat surface of the frame 110. Thus, the top surface of the cooling member 141 may directly or indirectly contact all of the battery cells 120.

Also, a flow path through which the cooling medium moves may be formed in the cooling member 141. For example, the cooling medium may be a coolant. Thus, the cooling medium moving along the flow path formed in the cooling member 141 may absorb heat generated from the battery cells 120. Thus, the battery cells 120 may be cooled as a temperature thereof is decreased by the cooling medium.

Here, the cooling member 141 may be made of a material having a high thermal conductivity. For example, the cooling member 141 may be made of aluminum or an aluminum alloy material. Thus, the cooling member 141 may easily transfer the heat generated from the battery cells 120 to the cooling medium. Thus, the temperature of the battery cells 120 may be quickly adjusted.

The cooling medium supply member 142 may be connected to the cooling member 141. For example, the cooling medium supply member 142 may be a line for supplying the cooling medium to the cooling member 141 and connected to one end of the flow path formed in the cooling member 141. Thus, the cooling medium supplied to the one end of the flow path through the cooling medium supply member 142 may absorb the heat of the battery cells 120 while passing through the flow path.

The cooling medium supply member 143 may be connected to the cooling member 141. For example, the cooling medium discharge member 143 may be a line for discharging the cooling medium in the cooling member 141 and connected to the other end of the flow path formed in the cooling member 141. Thus, the cooling medium may move from the one end to the other end of the flow path and be discharged to the outside through the cooling medium discharge member 143. However, the exemplary embodiment is not limited to the structure and shape of the heat sink 140. For example, the heat sink 140 may have various structures and shapes.

The cell holder 150 may have a plate shape. For example, the cell holder 150 may have a rectangular shape along the flat surface shape of the frame 110, and an area of a top surface of the cell holder 150 may be equal to or greater than that of the flat surface of the frame 110. Thus, when the cell holder 150 is installed so that a circumference of the top surface of the cell holder 150 contacts an one side end of the frame 110, the cell holder 150 may cover an entire cross-section (or lower portion) of the inner space of the frame 110. Thus, a lower opening formed in the frame 110 may be sealed by the cell holder 150.

Here, a material of the cell holder 150 may include plastic. Thus, the cell holder 150 may be manufactured at less cost than the filling material 130 made of silicon.

Also, a plurality of insertion holes B may be defined in the cell holder 150. Each of the insertion holes B may be formed along a circumferential shape of the battery cell 120, and an internal diameter of the insertion hole B may be equal to or greater than an external diameter of the battery cell 120. Thus, the other ends of the battery cells 120 may pass through and be inserted to the insertion holes B, respectively.

Here, the insertion holes B may respectively face the through-holes A of the frame 110. That is the insertion holes B may be arranged in the form of a×b based on the array of the through-holes A. Thus, the battery cell 120 may have the upper end inserted to and supported by the through-hole A and the lower end inserted to and supported by the insertion hole B. Thus, the battery cells 120 may maintain a stably fixed state.

The cell holder 150 may be provided in plurality. The cell holders 150 may be stacked to each other between the frame 110 and the heat sink 140. For example, as a first cell holder **150*a* and a second cell holder 150*b* are provided, the cell holders 150 may be stacked in a vertical direction and disposed in a spaced space between the frame 110 and the heat sink 140. Thus, a top surface of the first cell holder 150*a* may be connected to the lower portion of the frame 110, and a bottom surface of the second cell holder 150*b* may be connected to the heat sink 140. However, the exemplary embodiment is not limited to the number of the cell holders 150**. For example, three or more cell holders may be provided instead of two cell holders.

Here, the cell holders 150 may support the battery cells 120 together with the filling material 130. That is, the filling material 130 supports a circumference of the one end (or upper end) of each of the battery cells 120, and each of the cell holders 150 supports a circumference of the other end (or lower end) of each of the battery cells 120 except for the upper end of each of the battery cells 120. Since the filling material 130 is not filled in a space in which the cell holders 150 are disposed, as a portion supported by the cell holders 150 is increased in the battery cell 120, a portion supported by the filling material 130 may be decreased. Thus, a volume of the inner space of the frame 110 and an amount of the filling material 130 filled in the inner space of the frame 110 may be adjusted according to the number of staked cell holders 150.

For example, when the number of the provided cell holders 150 is increased, the volume of the inner space of the frame 110 may be decreased, and when the number of the provided cell holders 150 is decreased, the volume of the inner space of the frame 110 may be increased. Thus, when the volume of the inner space of the frame 110 is decreased, the amount of the filling material 130 filled in the inner space of the frame 110 may be decreased, and when the volume of the inner space of the frame 110 is increased, the amount of the filling material 130 filled in the inner space of the frame 110 may be increased. Thus, the usage amount of the filling material 130 may be decreased by adjusting the stacked number or height of the cell holders 150.

Here, as illustrated in FIG. 3, a total thickness L1 of the cell holders 150 may be 20% or more to 60% or less of a length L2 of the battery cell 120. When the total thickness L1 of the cell holders 150 is less than 20% of the length L2 of the battery cell 120, one portion of the battery cell 120, which is inserted to the cell holders 150, may be extremely decreased. Thus, as the volume of the inner space of the frame 110 is increased, the usage amount of the filling material 130 is increased to accommodate the other portion of the battery cell 120, which is not inserted to the cell holders 150. When the total thickness L1 of the cell holders 150 is greater than 60% of the length L2 of the battery cell 120, one portion of the battery cell 120, which is inserted to the cell holders 150, may be extremely increased. Thus, the size of the frame 110 is extremely decreased. The total thickness L1 of the cell holders 150 may be 20% or more to 60% or less of a length L2 of the battery cell 120 in order to decrease the usage amount of the filling material and appropriately maintain the size of the frame 110.

Also, a first projection 151 may be disposed on one of the frame 110 and the cell holder 150 installed closest to the frame 110, and a first coupling groove 112 to which the projection is inserted may be disposed on the other thereof For example, as illustrated in (a) of FIG. 4, the first projection 151 may protrude from the top surface of the first cell holder **150*a*, and the first coupling groove 112 may be defined in the lower end of the frame 110. Thus, when the first cell holder 150*a* is coupled to the lower side of the frame 110, the first projection 151 may be inserted to the first coupling groove 112. Thus, the first cell holder 150*a* and the frame 110 may be easily aligned in the vertical direction, and the first cell holder 150*a* and the frame 110** may be further stably coupled.

Also, each of the first projection 151 and the first coupling groove 112 may be provided in plurality. The first projections 151 may be disposed along a circumference of the first cell holder **150*a*, and the first coupling grooves 112 may be disposed along a lower circumference of a wall of the frame 110 to face the first projections 151. Thus, the entire circumferences of the first cell holder 150*a* and the frame 110 may be stably coupled. However, the exemplary embodiment is not limited thereto. For example, the first coupling groove may be defined in the first cell holder 150***a*, and the first projection may protrude downward from the frame 110.

Also, as illustrated in (b) of FIG. 4, a second groove 153 may be defined in a bottom surface of the first cell holder 150*a*, and a second projection 152 may protrude from a top surface of the second cell holder 150*b*. Thus, when the second cell holder 150*b* is coupled to a lower side of the first cell holder 150*a*, the second projection 152 may be inserted to the second coupling groove 153. Thus, the first cell holder 150*a* and the second cell holder 150*b* may be easily aligned in the vertical direction and further stably coupled.

Also, each of the second projection 152 and the second coupling groove 153 may be provided in plurality. The second projections 152 may be disposed along a circumference of the second cell holder 150*b*, and the second coupling grooves 153 may be disposed along a circumference of the first cell holder 150*a* to face the second projections 152. Thus, the entire circumferences of the first cell holder 150*a* and the second cell holder 150*b* may be stably coupled. However, the exemplary embodiment is not limited thereto. For example, the second projection may protrude downward from the first cell holder 150*a*, and the second coupling groove may be defined in the second cell holder 150*b*.

Also, the cell holder 150 may include a plurality of fixing plates. The fixing plates may be detachably connected to each other on a plane in correspondence to an arrangement structure of the battery cells 120. That is, the fixing plates to be used may be selectively coupled according to the arrangement structure of the battery cells 120.

Here, when the insertion holes B may be defined in the fixing plate, and at least a portion of the fixing plates may have the different number of the insertion holes B. For example, as illustrated in FIG. 5, a first fixing plate 150-1 in which the insertion holes B are arranged in an array of 3×3, a second fixing plate 150-2 in which the insertion holes B are arranged in an array of 3×2, a third fixing plate 150-3 in which the insertion holes B are arranged in an array of 2×3, and a fourth fixing plate 150-4 in which the insertion holes B are arranged in an array of 2×2 may be provided.

When the battery cells 120 are arranged in an array of 5×5, one cell holder 150 obtained by connecting the first fixing plate 150-1, the second fixing plate 150-2, the third fixing plate 150-3, and the fourth fixing plate 150-4 may be used as illustrated in (a) of FIG. 5. When the battery cells 120 are arranged in an array of 3×5, one cell holder 150 obtained by connecting the first fixing plate 150-1 and the second fixing plate 150-2 may be used as illustrated in (b) of FIG. 5. When the battery cells 120 are arranged in an array of 5×3, one cell holder 150 obtained by connecting the first fixing plate 150-1 and the third fixing plate 150-3 may be used as illustrated in (c) of FIG. 5. Thus, a structure of the cell holder 150 may be easily changed according to the various arrangement structures of the battery cells 120. However, the exemplary embodiment is not limited to the number or the structure of the fixing plate. For example, the fixing plate may have various structures and provided numbers.

FIG. 6 is a flowchart representing a method for manufacturing a battery pack in accordance with an exemplary embodiment. Hereinafter, the method for manufacturing the battery pack in accordance with an exemplary embodiment will be described.

The method for manufacturing the battery pack in accordance with an exemplary embodiment relates to a method for stably fixing the battery pack and reducing a usage amount of a filling material. Referring to FIG. 6, the method for manufacturing the battery pack includes: a process S110 of storing one ends of battery cells in an inner space of a frame; a process S120 of stacking a plurality of cell holders at one side of the frame and respectively inserting the other ends of the battery cells, which protrude to the outside of the frame, to insertion holes defined in cell holders; and a process S130 of injecting a filling material into the inner space of the frame to support circumferences of the one ends except for the other ends of the battery cells.

Referring to FIGS. 1 to 3, one end (upper end) of each of battery cells 120 may be stored in an inner space of a frame 110 in the process S110. That is, the battery cells 120 may be entered to the inner space of the frame 110 through an opened one side (or lower side) of the frame 110, and terminals of the battery cells 120 may be respectively inserted to through-holes A defined in the other side (or top surface) of the frame 110. Thus, the battery cells 120 may be aligned along an arrangement shape of the through-holes A.

Here, each of the battery cells 120 may have a vertical length greater than that of the frame 110. Thus, the battery cells 120 may have the one ends disposed in the inner space of the frame 110 and the other ends (or lower ends) protruding downward and disposed at the outside of the frame 110.

Thereafter, a plurality of cell holders 150 may be stacked at one side of the frame 110. The cell holders 150 may be stacked and coupled to each other in a vertical direction, and a first cell holder 150*a* disposed at an uppermost side of the cell holders 150 may contact a lower portion of the frame 110 to cover the opened lower side of the frame 110.

Also, insertion holes B are formed in the cell holders 150. Thus, the other ends of the battery cells 120 may be inserted to the insertion holes B, respectively. Thus, the battery cells 120 may be stably fixed in position as the one ends of the battery cells 120 are disposed in the frame 110, and the other ends are supported by the cell holder 150.

Since the cell holders 150 are stacked, the insertion holes B formed in the cell holders 150 may communicate each other to have an increased vertical length. Thus, a portion of the battery cells 120, which is inserted to the insertion holes B communicating each other, may be increased, and a portion of the battery cells 120, which is disposed in the inner space of the frame 110, may be decreased. Thus, a volume of the inner space of the frame 110 may be decreased by decreasing the vertical length of the frame 110 as many as the number of the provided cell holders 150.

Also, a volume of the inner space of the frame 110 and an amount of the filling material 130 filled in the inner space of the frame 110 may be adjusted while the cell holders 150 are stacked. That is, when the number of the provided cell holders 150 is increased, the volume of the inner space of the frame 110 may be decreased, and when the number of the provided cell holders 150 is decreased, the volume of the inner space of the frame 110 may be increased. Thus, when the volume of the inner space of the frame 110 is decreased, the amount of the filling material 130 filled in the inner space of the frame 110 may be decreased, and when the volume of the inner space of the frame 110 is increased, the amount of the filling material 130 filled in the inner space of the frame 110 may be increased. Thus, the usage amount of the filling material 130 may be decreased by adjusting the number or the height of the stacked cell holders 150.

Here, as illustrated in FIG. 3, a total thickness L1 of the cell holders 150 may be 20% or more to 60% or less of a length L2 of the battery cell 120. When the total thickness L1 of the cell holders 150 is less than 20% of the length L2 of the battery cell 120, a portion of the battery cell 120 inserted to the cell holders 150 may be extremely decreased. Thus, as the volume of the inner space of the frame 110 is increased, the usage amount of the filling material 130 is increased to accommodate the other portion of the battery cell 120, which is not inserted to the cell holders 150. When the total thickness L1 of the cell holders 150 is greater than 60% of the length L2 of the battery cell 120, one portion of the battery cell 120, which is inserted to the cell holders 150, may be extremely increased. Thus, a size of the frame 110 is extremely decreased. The total thickness L1 of the cell holders 150 may be 20% or more to 60% or less of the length L2 of the battery cell 120 in order to decrease the usage amount of the filling material and appropriately maintain the size of the frame 110.

Thereafter, the filling material may be injected to the inner space of the frame in order to support a circumference of the one end except for the other end of each of the battery cells in the process S130. That is, the filling material 130 may be filled in an empty space that is not occupied by the battery cells 120 in the inner space of the frame 110. Thus, the filling material 130 may be supplied between the battery cells 120 to hold the battery cells 120.

Here, the volume of the inner space of the frame 110 is decreased by the cell holders 150. Thus, the usage amount of the filling material 130 supplied to fill the inner space of the frame 110 may be decreased. When the usage amount of the filling material 130 is decreased, a time and costs required to fill the filling material 130 may be decreased. That is, since the filling material 130 is not filled in a space in which the cell holders 150 are stacked, the usage amount of the filling material 130 may be adjusted according to the stacked number or height of the cell holders 150 set based on a design specification of a battery pack 100.

Also, when the cell holders 150 are installed at one side of the frame 110 or after the filling material 130 is supplied to the inner space of the frame 110, an operation of installing a heat sink 140 may be performed. The heat sink 140 may be coupled to a second cell holder 150*b* disposed at a lowermost side of the cell holders 150 and directly or indirectly contact the battery cells 120 passing through the cell holders 150. Thus, the heat sink 140 may easily adjust a temperature of the battery cells 120.

As described above, the battery cells 120 may be fixed by using the plurality of cell holders 150. Thus, although the amount of the filling material 130 filled in a space between the battery cells 120 is decreased, the battery cells 120 may be stably supported. Thus, an efficiency of a process of manufacturing the battery pack 100 may be improved by decreasing the usage amount of the filling material 130.

In accordance with the exemplary embodiment, the battery cells may be fixed by using the plurality of cell holders. Thus, although the amount of the filling material filled in the space between the battery cells is decreased, the battery cells may be stably supported. Thus, the efficiency of the process of manufacturing the battery pack may be improved by decreasing the usage amount of the filling material.

Although a preferred embodiment of the present invention has been described in the detailed description of embodiments, various changes and modifications may be made thereto without departing from the scope and spirit of the present invention defined by the appended claims. Therefore, the scope of the invention is defined not by the detailed description of the invention but by the appended claims, and all differences within the scope will be construed as being included in the present invention.

What is claimed is:

1. A battery pack, comprising:

a frame having an inner space, an upper surface, and an opened lower side;

a plurality of battery cells each having a first end disposed in or at the inner space of the frame and a second end protruding to an outside of one side of the frame;

a filling material filled in the inner space of the frame;

a heat sink disposed to face one side of the frame and configured to cool the plurality of battery cells; and a plurality of cell holders located at the second ends of the plurality of battery cells, wherein each of the plurality of cell holders has a respective plurality of insertion holes to which the second ends of the plurality of battery cells are respectively inserted, wherein the plurality of cell holders are stacked to each other in a vertical direction between the frame and the heat sink, wherein each of the plurality of cell holders has a same size in a plane perpendicular to the vertical direction, wherein a volume of the inner space of the frame and an amount of the filling material filled in the inner space of the frame are adjusted according to a stacked number of the plurality of cell holders, and wherein lowermost surfaces of the plurality of battery cells are positioned below the frame, the heat sink is disposed below the lowermost surfaces of the plurality of battery cells, the heat sink comprises a cooling member having a plate shape, and an upper surface of the cooling member directly or indirectly contacts the lowermost surfaces of the plurality of battery cells.

2. The battery pack of claim 1, wherein the plurality of cell holders support a circumference of the second ends of the plurality of battery cells, and wherein the filling material is not filled in a space in which the plurality of cell holders are disposed and support the first ends except for the second ends of the plurality of battery cells.

3. The battery pack of claim 1, wherein one of the plurality of cell holders has a plate shape to cover a cross-section of the inner space of the frame, and a circumference of the one of the plurality of cell holders contacts one side end of the frame.

4. The battery pack of claim 3, wherein the one of the plurality of cell holders comprises a plurality of fixing plates that are detachably connected on a plane in correspondence to an arrangement structure of the plurality of battery cells, and wherein the respective plurality of insertion holes of the one of the plurality of cell holders are defined in the plurality of fixing plates.

5. The battery pack of claim 4, wherein at least a portion of the plurality of fixing plates has a different number of the respective plurality of insertion holes.

6. The battery pack of claim 3, wherein a total thickness of the stacked plurality of cell holders is between 20% and 60% of a length of one of the plurality of battery cells.

7. The battery pack of claim 3, wherein a projection is on one of the frame and the plurality of cell holders that is closest to the frame, and wherein a coupling groove into which the projection is inserted is on the other thereof.

8. The battery pack of claim 1, wherein a material of each of the plurality of cell holders comprises plastic, and a material of the filling material comprises silicon.

9. The battery pack of claim 1, wherein the plurality of cell holders are immediately adjacent to each other.

10. The battery pack of claim 1, wherein the frame has an uppermost surface, and the filling material is in contact with the uppermost surface.

11. The battery pack of claim 1, wherein the battery pack further comprises busbars positioned above the upper surface of the frame, wherein the first ends of the plurality of battery cells comprise terminals, and wherein the terminals are electrically connected to the busbars.

12. The battery pack of claim 1, wherein the second ends of the plurality of battery cells are positioned lower than the first ends of the plurality of battery cells, wherein the second ends of the plurality of battery cells comprise the lowermost surfaces of the plurality of battery cells, and wherein the frame further has a side opening located between the upper surface of the frame and the opened lower side of the frame.

13. A method for manufacturing a battery pack having a plurality of battery cells, the method comprising:

storing first ends of each of the plurality of battery cells in or at an inner space of a frame;

stacking a plurality of cell holders at one side of the frame and respectively inserting second ends of the plurality of battery cells that protrude to an outside of the frame to a respective plurality of insertion holes formed in each of the plurality of cell holders; and injecting a filling material into the inner space of the frame to support a circumference of each of the first ends such that the second ends of the plurality of battery cells are not in contact with the filling material, wherein the plurality of cell holders are located at the second ends of the plurality of battery cells, wherein the plurality of cell holders are stacked to each other in a vertical direction, wherein each of the plurality of cell holders has a same size in a plane perpendicular to the vertical direction, wherein the stacking of the plurality of cell holders comprises setting a stacked number of the plurality of cell holders to adjust a volume of the inner space of the frame and an amount of the filling material filled in the inner space of the frame, wherein the frame has an upper surface and an opened lower side, and wherein lowermost surfaces of the plurality of battery cells are positioned below the frame, a heat sink is disposed below the lowermost surfaces of the plurality of battery cells, the heat sink comprises a cooling member having a plate shape, and an upper surface of the cooling member directly or indirectly contacts the lowermost surfaces of the plurality of battery cells.

14. The method of claim 13, wherein the setting of the stacked number of the plurality of cell holders comprises adjusting a total thickness of the stacked plurality of cell holders in a range from 20% to 60% of a length of one of the plurality of battery cells.

* * * * *